United States Patent
Oku et al.

(10) Patent No.: US 11,719,365 B2
(45) Date of Patent: Aug. 8, 2023

(54) THREADED CONNECTION FOR STEEL PIPE

(71) Applicants: NIPPON STEEL CORPORATION, Tokyo (JP); VALLOUREC OIL AND GAS FRANCE, Aulnoye-Aymeries (FR)

(72) Inventors: Yousuke Oku, Tokyo (JP); Sadao Douchi, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 119 days.

(21) Appl. No.: 17/595,734

(22) PCT Filed: Aug. 20, 2020

(86) PCT No.: PCT/JP2020/031462
§ 371 (c)(1),
(2) Date: Nov. 23, 2021

(87) PCT Pub. No.: WO2021/044862
PCT Pub. Date: Mar. 11, 2021

(65) Prior Publication Data
US 2022/0252188 A1    Aug. 11, 2022

(30) Foreign Application Priority Data
Sep. 2, 2019  (JP) .............................. JP2019-159375

(51) Int. Cl.
*F16L 15/06*    (2006.01)
*E21B 17/042*   (2006.01)

(52) U.S. Cl.
CPC ............ *F16L 15/06* (2013.01); *E21B 17/042* (2013.01)

(58) Field of Classification Search
CPC ........ F16L 15/06; F16L 15/001; E21B 17/042
See application file for complete search history.

(56) References Cited

U.S. PATENT DOCUMENTS

| | | | |
|---|---|---|---|
| RE30,647 E | 1/1981 | Blose | |
| 10,480,693 B2 | 11/2019 | Oku et al. | |
| 2011/0278838 A1 | 11/2011 | Martin et al. | |
| 2017/0108151 A1 | 4/2017 | Oku et al. | |
| 2019/0093799 A1 | 3/2019 | Sugino et al. | |

FOREIGN PATENT DOCUMENTS

| | | |
|---|---|---|
| JP | 2012512347 A | 5/2012 |
| WO | 2015194193 A1 | 12/2015 |
| WO | 2017213048 A1 | 12/2017 |
| WO | 2019076622 A1 | 4/2019 |

*Primary Examiner* — David Bochna
(74) *Attorney, Agent, or Firm* — Greer Burns & Crain Ltd.

(57) ABSTRACT

A threaded connection for large diameter steel pipe exhibits high torque resistance and high sealability and, at the same time, provides a shear resistance that suits the size of the steel pipe to be connected. The threaded connection includes a tubular pin provided on a tip of a steel pipe with large diameter, and a tubular box 20 adapted to be drawn up on the pin as the pin is screwed in. The pin includes a male threadform made with a taper thread. The box includes a female threadform made with a taper thread. Each of the threadforms are wedge threads and have a dovetail-shaped cross section. The male threadform is designed such that the width of the thread in an end region of the male threadform closer to the tip is set to a size corresponding to the size of the pipe body of the steel pipe.

12 Claims, 5 Drawing Sheets

THREADED CONNECTION FOR STEEL PIPE

TECHNICAL FIELD

The present disclosure relates to a threaded connection for steel pipe used to connect steel pipes.

BACKGROUND ART

Steel pipes called oil-well pipes are used, for example, for prospecting or production in oil wells, natural-gas wells etc. (hereinafter collectively referred to as "oil wells" or the like), developing non-conventional resources such as oil sand or shale gas, retrieving or storing carbon dioxide (Carbon dioxide Capture and Storage (CCS)), for geothermal power generation, or in hot springs. A threaded connection is used to connect steel pipes.

Such threaded connections for oil-well pipe are generally categorized as coupling type and integral type.

A coupling-type connection connects steel pipes using a tubular coupling. Specifically, a female thread is provided on the inner periphery of each of the ends of the coupling, while a male thread is provided on the outer periphery of each of the ends of a steel pipe. Then, one end of one steel pipe is screwed onto one end of the coupling and one end of another steel pipe is screwed onto the other end of the coupling such that these steel pipes are connected. That is, a coupling-type connection directly connects a pair of pipes, one of which is a steel pipe and the other one is a coupling.

An integral connection directly connects steel pipes without using a separate coupling. Specifically, a female thread is provided on the inner periphery of one end of a steel pipe while a male thread is provided on the outer periphery of the other end, and the one end of one steel pipe provided with a male thread is screwed into the other end of another steel pipe provided with a female thread such that these steel pipes are connected.

A connection portion of a pipe end of a steel pipe on which a male thread is provided includes an element to be inserted into a female thread provided on a steel pipe or coupling, and thus is usually referred to as "pin". An end portion of a steel pipe or coupling on which a female thread is provided includes an element for receiving a male thread of a steel pipe, and thus is referred to as "box". A pin and a box constitute ends of pipes and thus are tubular in shape.

In recent years, such well development techniques as DwC (Drilling with Casing) and horizontal drilling have become widespread, causing a rapid increase in demand for high-torque connections. The applicants of the present application have manufactured high-torque connections for steel pipe with outer diameters up to 9-⅝" (244.5 mm), constituted by threaded connections using tapered threads with dovetail-shaped cross sections, which are also known as wedge threads, such as those disclosed by Patent Document 1, identified below. With wedge threads, the thread ridge width of a male threadform on the pin gradually decreases as it goes along the helix of the thread toward the tip, while the thread groove width of a female threadform on the opposite box gradually decreases in an analogous manner. Further, both of the load flanks and stab flanks of the threads of the male and female threadforms have negative flank angles; when the make-up of the pin and the box has been finished, the load flanks are in contact with each other and the stab flanks are in contact with each other such that the threads of the male and female threadforms are strongly fitted. This construction allows a threaded connection with wedge threads to exhibit high torque resistance.

PRIOR ART DOCUMENTS

Patent Documents

[Patent Document 1] WO 2015/194193 A1

SUMMARY OF THE INVENTION

Problems to be Solved by the Invention

The applicants of the present application have been developing high-torque threaded connections for steel pipe with yet larger diameters. When they designed threaded connections with diameters larger than 9-⅝" in accordance with design standards that are substantially the same as the conventional ones and subjected trial products complying with ISO 13679:2011, Series A to complex load testing, a shear fracture occurred in a thread of the male threadform on the pin upon application of the maximum tensile load.

An object of the present disclosure is to provide a threaded connection for steel pipe with large diameter that can exhibit high torque resistance and high sealability and, at the same time, provide a shear resistance that suits the size of the steel pipe to be connected.

Means for Solving the Problems

The present inventors did extensive research to identify the cause of thread breaks in the male threadform in a high-torque threaded connection for steel pipe with large diameter, and found that the thread width at the end of the male threadform which is closer to the tip is too small relative to the tensile strength, or in other words shear resistance, required from a steel pipe with large diameter, and a shear fracture occurs first in the first round of the threadform starting from this threadform end (hereinafter also referred to as "first thread"). When a shear fracture occurs in the first thread, loads are concentrated on the second thread, which is the next thread located inward as seen in a cross section in the second thread, causing a shear fracture in the second thread, which in turn causes loads to be concentrated on the third thread, which is the next thread located inward, causing a shear fracture here, and so forth; in this way, it is assumed that shear fractures occur successively in threads of the male threadform across a large area.

If a conventional taper thread with a trapezoidal cross section is used, application of an excessive tensile load does not cause breaks in threads across a wide range, though the pin and the box may deform such that the male and female threads jump out. On the other hand, in a high-torque threaded connection as discussed above, the threads of the cross-sectionally dovetail-shaped male and female threadforms are strongly engaged, and thus the male and female threadforms are never disengaged.

Accordingly, in a high-torque threaded connection with male and female threadforms constituted by dovetail-shaped wedge threads as seen in a cross section, the rigidity of the first thread, in which a shear fracture occurs first, is important to provide a certain tensile strength. As an indicator for evaluating the shear resistance of the first thread, the present inventors focused on a cylinder's volume $V=\pi/4 \cdot \{(D_W+2T_H)^2-DW^2\} \times W_{min}$, where $W_{min}$ is the minimum width of the thread in an end region of the male threadform located closer to the tip, measured at the portion of the thread having the smallest thread width (i.e. thread base), which is treated as the axial length; $D_W$ is the thread root diameter in that region, which is treated as the inner diameter of the cylinder; and $T_H$ is the thread height, which is treated as the wall thickness.

Further, the shear resistance required from a thread varies depending on the magnitude of the tensile load at which the pipe body of the steel pipe yields.

Based on all this research, the present inventors found that, if threads in an end portion of the male threadform have a shear resistance that suits the size of the steel pipe, the threaded connection for steel pipe with large diameter exhibits high torque resistance and high sealability without a shear fracture in a thread.

The threaded connection for steel pipe according to the present disclosure includes a tubular pin provided on a tip of a steel pipe with an outer diameter OD larger than 240 mm, and a tubular box adapted to be made up on the pin as the pin is screwed in. The pin includes a male threadform made with a taper thread formed on an outer periphery of the pin and having a dovetail-shaped cross section. The box includes a female threadform made with a taper thread formed on an inner periphery of the box and having a dovetail-shaped cross section. This female threadform has a thread profile corresponding to the male thread. Further, a stab-flank pitch for the male threadform and the female threadform is smaller than a load-flank pitch for the male threadform and the female threadform.

The male threadform satisfies the following expressions, (1) and (2):

$$0.40 \leq \frac{\{(D_W + 2T_H)^2 - D_W^2\} \times W_{min}}{\{(OD)^2 - (ID)^2\}} \leq 0.60, \text{ and} \quad (1)$$

$$W_{min} \geq 3.0 \text{ mm}. \quad (2)$$

In expressions (1) and (2), OD is the outer diameter of the steel pipe, ID is the inner diameter of the steel pipe, $D_W$ is the diameter of the root adjacent to the load flank at the end of the male threadform closer to the tip, $T_H$ is the thread height of the male threadform, and $W_{min}$ is the width of the thread, measured at the thread base, in an end region of the male threadform closer to the tip.

Effects of the Invention

The present disclosure provides a threaded connection for steel pipe with large diameter that includes a male threadform on a pin with a shear resistance that suits the size of the steel pipe with large diameter and that provides high torque resistance and high sealability.

EMBODIMENTS FOR CARRYING OUT THE INVENTION

The threaded connection for steel pipe according to the present embodiment includes a tubular pin provided on a tip of a steel pipe with an outer diameter OD larger than 240 mm, and a tubular box adapted to be made up on the pin as the pin is screwed in. The pin includes a male threadform made with a taper thread formed on an outer periphery of the pin and having a dovetail-shaped cross section. The box includes a female threadform made with a taper thread formed on an inner periphery of the box and having a dovetail-shaped cross section. This female threadform has a thread profile corresponding to the male threadform.

Further, the stab-flank pitch for the male threadform and the female threadform is smaller than the load-flank pitch for the male threadform and the female threadform. That is, each of the male and female threadforms is constituted by a wedge thread having a thread width that gradually decreases or increases toward the tip.

The male threadform satisfies the following expressions, (1) and (2):

$$0.40 \leq \frac{\{(D_W + 2T_H)^2 - D_W^2\} \times W_{min}}{\{(OD)^2 - (ID)^2\}} \leq 0.60, \text{ and} \quad (1)$$

$$W_{min} \geq 3.0 \text{ mm}. \quad (2)$$

In expressions (1) and (2), OD is the outer diameter of the steel pipe, ID is the inner diameter of the steel pipe, $D_W$ is the diameter of the root adjacent to the load flank at the end of the male threadform closer to the tip, $T_H$ is the thread height of the male threadform, and $W_{min}$ is the width of the thread, measured at the thread base, in an end region of the male threadform closer to the tip. The thread heights of the male and female threadforms are generally equal. The thread height of the male threadform and the thread height of the female threadform are constant across the entire length of the helical perfect-thread portion.

More preferably, the male threadform satisfies the following expression, (3):

$$0.45 \leq \frac{\{(D_W + 2T_H)^2 - D_W^2\} \times W_{min}}{\{(OD)^2 - (ID)^2\}} \leq 0.50. \quad (3)$$

In the threaded connection for steel pipe according to the present disclosure, the thread height $T_H$ of the male threadform is preferably not smaller than 1.8 mm, to provide sufficient torque resistance. On the other hand, if the thread height $T_H$ of the male threadform is too large, this means deep thread grooves on the inner periphery of the box, which reduces the tensile strength of the box; in view of this, the thread height $T_H$ of the male threadform is preferably not larger than 2.3 mm.

The cross-sectional shapes of the thread crests of the male and female threadforms and the cross-sectional shapes of the roots of the male and female threadforms may be line segments parallel to the axis of the steel pipe, or may be line segments inclined by the taper angle of the entire male and female threads.

"Male threadform" and "female threadform" as defined in the claims may include a perfect-thread area, where the range in which the perfect-thread area of the male threadform and the perfect-thread area of the female threadform are fitted when the pin and the box are made up may have an axial length of 40 to 60 mm. An imperfect-thread area may be provided that extends immediately from the end, closer to the tip, of one or each of the perfect-thread areas constituting the male and female threadforms. An imperfect-thread area or another perfect-thread area with a constant thread width may be provided that extends immediately from the end, closer to the basement, of one or each of the perfect-thread areas constituting the male and female threadform defined by the claims (i.e. end closer to the pipe body of the steel pipe). In the context of the present disclosure, a perfect-thread area may be an area having successive threads with a constant thread height, and an imperfect-thread area may be an area with a gradually decreasing thread height. When the connection is made up, both the load flanks and stab flanks of threads in the perfect-thread area and imperfect-thread area of the male threadform may be in contact with the load flanks and stab flanks of threads of the female threadform. When the connection is made up, both the load flanks and stab flanks of threads in the perfect-thread area and imperfect-thread area of the female threadform may be in contact with the load flanks and stab flanks of threads of the male threadform.

Each of the load and stab flanks of each thread having a dovetail-shaped cross section has a negative flank angle. For example, the flank angle of the load and stab flanks may be −10° to −1°. The flank angle of the load flank is the angle formed between the load flank and a straight line perpendicular to the pipe axis CL (see FIG. 1) as seen in a longitudinal cross section. The flank angle of the stab flank is the angle between the stab flank and a straight line perpendicular to the pipe axis CL as seen in a longitudinal cross section. If the load or stab flank is parallel to a straight line perpendicular to the pipe axis CL, the flank angle is 0°. If the load or stab flank of the male thread is inclined so as to face radially outward, the flank angle of this flank takes on a positive value. On the contrary, if the load or stab flank of the male thread is inclined so as to face radially inward, the flank angle of this flank takes on a negative value. If the load or stab flank of the female thread is inclined so as to face radially inward, the flank angle of this flank takes on a positive value. On the contrary, if the load or stab flank of the female thread is inclined so as to face radially outward, the flank angle of this flank takes on a negative value.

The outer diameter of the pipe body of the steel pipe may be more preferably not smaller than 245 mm, and yet more preferably not smaller than 270 mm. The outer diameter of the pipe body of the steel pipe is preferably not larger than 400 mm, and yet more preferably not larger than 350 mm, and still more preferably not larger than 310 mm. The pipe body of the steel pipe preferably has a wall thickness that is generally constant across the entire axial length. The pipe body of the steel pipe preferably has outer and inner diameters that are generally constant across the entire axial length. The pin is provided on an end of the pipe body of the steel pipe.

During pipe-making for a steel pipe, the inner and outer surfaces of the pipe are rolled while the pipe is rotated by a tool. However, the pipe-making is affected by various factors, such as the position of the tool during rolling, the wear of the tool and rolling temperature, such that the resulting steel pipe may not necessarily have a perfectly circular cross section, but may be deformed to have a cross section that is not perfectly circular, such as elliptical. Regardless of whether the pipe has a perfectly circular or not perfectly circular shape, the outer diameter of the steel pipe produced is measured at a plurality of points arranged in the circumferential direction, and the pipe is shipped as an accepted product if the maximum of these measurements is lower than a value specified by the API (American Petroleum Institute) (according to the current standard, 101% of the nominal outer diameter of the steel pipe). The outer diameter OD of the steel pipe according to the present disclosure may be the nominal outer diameter of the steel pipe.

The inner diameter is also checked, where the inner diameter and inner surface of the produced steel pipe are measured using a drift gauge, as disclosed by JP 2016-130668 A. The diameter of the drift gauge is also specified by API standards: for a steel pipe with 10-¾" 65.7# (outer diameter of pipe body: 273.05 mm; inner diameter of pipe body: 242.82 mm), the specified drift diameter is the nominal inner diameter of the steel pipe minus 5/32 inches; thus, the produced steel pipe can be shipped as an accepted product if the minimum value of the inner diameter of the pipe is not smaller than 242.82−5/32×25.4=238.851 mm. The inner diameter ID of the steel pipe according to the present disclosure may be the nominal inner diameter of the steel pipe.

The thread height $T_H$ may also be the nominal thread height of the steel pipe. $D_W$ and $W_{min}$ in expression (1) above may be calculated based on the nominal values of various parameters defining the profile of the taper thread, such as thread length, thread taper angle, thread height, load-flank pitch, and stab-flank pitch.

The above-listed nominal values, when applied to oil-well pipes, comply with API standards, and the dimensions of the various portions can be considered to be the nominal values if they are within the tolerances specified by API standards. The outer diameter OD, inner diameter ID, thread height $T_H$, $D_W$ and $W_{min}$ may be measured values. If the steel pipe has a cross section that is not perfectly circular, it is preferable to use values obtained by rectifying the steel pipe, in reality or in a simulation, so as to have a perfectly circular cross section.

The threaded connection for steel pipe according to the present embodiment will now be described with reference to the drawings. In the drawings, the same and corresponding elements are labeled with the same characters, and the same description will not be repeated.

Figure 1:
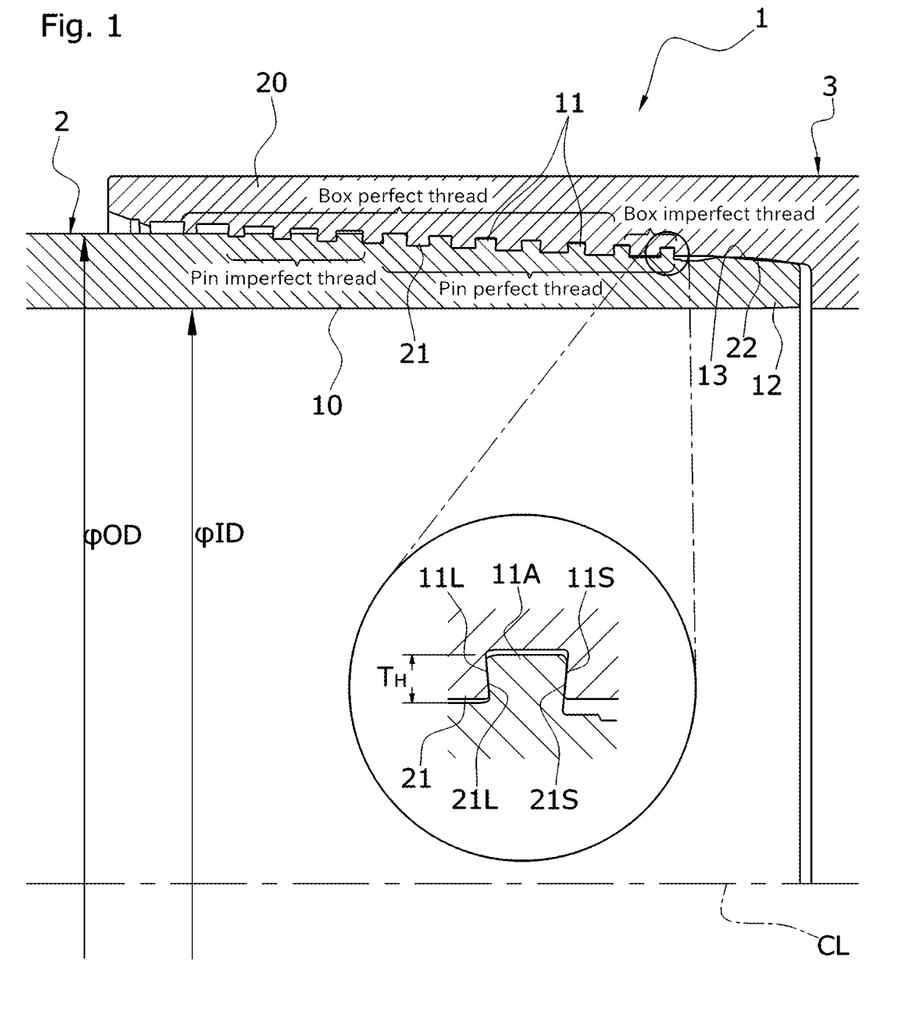
FIG. 1 is a longitudinal cross-sectional view of a threaded connection for steel pipe according to an embodiment, taken along its pipe axis.

Referring to FIG. 1, a threaded connection 1 for steel pipe according to the present embodiment includes a tubular pin 10 and a tubular box 20. The pin 10 is formed from an end portion of a steel pipe 2. The box 20 is formed from an end portion of a coupling, and is adapted to be made up on the pin 10 as the pin 10 is inserted therein. The portions of the steel pipe 2 excluding the end portions may also be referred to herein as "pipe body". FIG. 1 shows the axis CL of the steel pipe 2, the outer diameter OD of the pipe body of the steel pipe 2, i.e. the diameter of the outer periphery, and the inner diameter ID of the pipe body, i.e. the diameter of the inner periphery. The steel pipe 2 of the present embodiment is a large-diameter steel pipe in which the outer diameter OD of the pipe body is larger than 240 mm.

The pin 10 includes a male threadform 11 and a lip 12. The male threadform 11 is constituted by a thread extending helically on the outer periphery of the pin 10. The male threadform 11 is constituted by a wedge thread having a thread width that gradually decreases toward the tip of the pin 10. Each thread of the male threadform 11 has a dovetail-shaped cross section. The lip 12 extends from the end, closer to the tip, of the male threadform 11 to the tip. The pin seal portion 13 is provided on the outer periphery of the lip 12. In the implementation shown, the pin seal portion 13 is constituted by a cylindrical sealing surface that is shaped as an arc as seen in a cross section; alternatively, the cross-sectional shape of the pin seal portion 13 may be a straight line, or may be a combination of a straight line and an arc.

The box 20 includes an open end for receiving the pin 10. The box 20 includes a female threadform 21 provided on its inner periphery and a box seal portion 22. The female threadform 21 is complementary to the male threadform 11, being constituted by a thread that extends helically on the inner periphery of the box 20. The female threadform 21 is constituted by a wedge thread having a thread width that gradually increases from the open end toward the interior of the box 20. Each thread of the female threadform 21 has a dovetail-shaped cross section. The box seal portion 22 is composed of a taper surface located further toward the interior of the box 20 than the female threadform 21. The box seal portion 22 may be constituted by a cylindrical sealing surface that is shaped as an arc as seen in a cross section, or may be shaped as a combination of a straight line and an arc as seen in a cross section.

Figure 2:
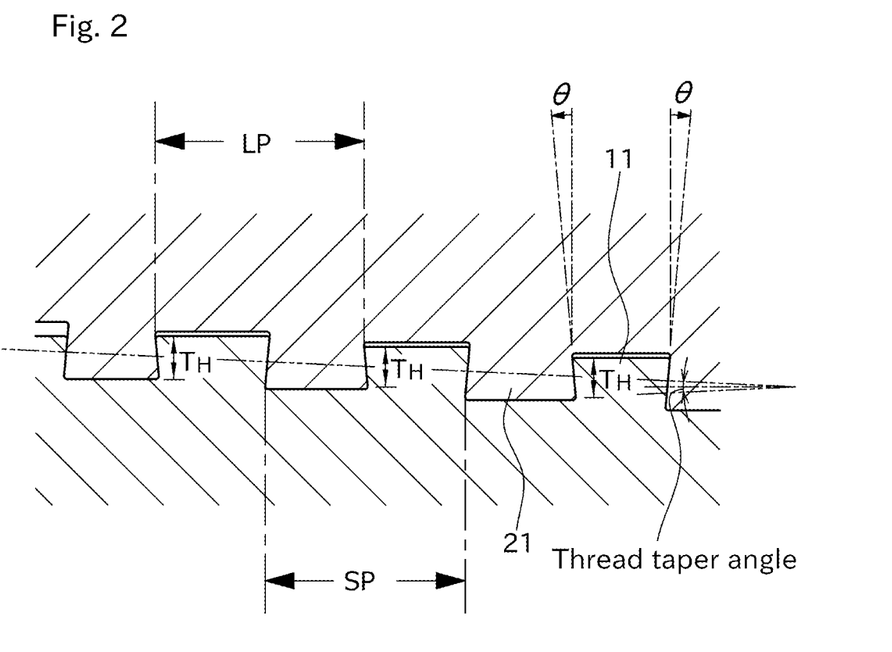
FIG. 2 is an enlarged longitudinal cross-sectional view of the male and female threadforms of FIG. 1.

As shown in FIGS. 1 and 2, the male threadform 11 of the present embodiment includes a pin perfect-thread area and a pin imperfect-thread area. The pin perfect-thread area is the area including threads having a predetermined thread height $T_H$ and arranged with predetermined load-flank pitch LP and stab-flank pitch SP. The pin imperfect-thread area is the area where the cut depth on the outer surface of the steel pipe 2 is not enough to provide a predetermined thread height, resulting from the fact that the imaginary taper surface defining the taper shape of the taper thread crosses the outer surface of the steel pipe 2. The female threadform 21 includes a box perfect-thread area and a box imperfect-thread area. The box perfect-thread area extends from near the open end of the box 20 to near the second thread of the male threadform 11 on the pin 10. The threads in the box imperfect-thread area engage the first thread 11A of the male threadform 11 on the pin 10 when the pin 10 and box 20 are made up. As shown in FIG. 2, when the connection is made up, the thread height in the perfect-thread area of the male threadform 11 is smaller than the thread height in the perfect-thread area of the female threadform 21 such that a small clearance (about 0.1 mm, for example) is created between a thread crest of the male threadform 11 and a thread root of the female threadform 21 while a thread crest of the female threadform 21 is in contact with a thread root of the male threadform 11. Preferably, the range in which the perfect-thread area of the male threadform 11 is fitted to the perfect-thread area of the female threadform 21 when the connection is made up has an axial length of 40 to 60 mm.

As shown in FIGS. 1 and 2, each of the load flank 11L, 21L and stab flank 11S, 21S of each thread of the male and female threadforms 11 and 21 has a negative flank angle θ. The flank angle θ of the load flanks 11L and 21L and the flank angle θ of the stab flanks 11S and 21S may be the same, or may be different.

When the pin 10 and box 20 are made up, the stab flank 11S and load flank 11L of a thread of the male threadform 11 are in contact with the stab flank 21S and load flank 21L of a thread of the female threadform 21 such that the pin 10 is locked on the box 20, thereby providing high torque resistance and, as the pin seal portion 13 is fitted to the box seal portion 22 by interference fit, providing high sealability.

Figure 3:
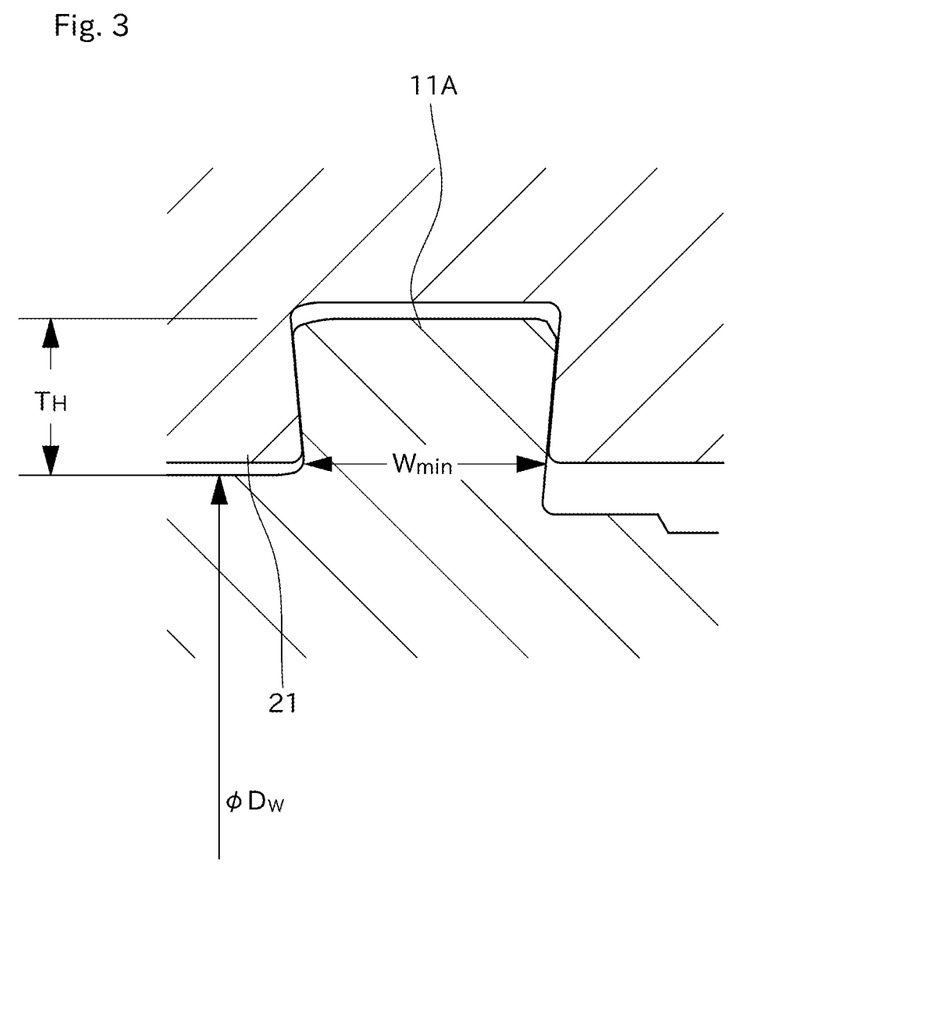
FIG. 3 is an enlarged longitudinal cross-sectional view of an end region of the male threadform of FIG. 1 closer to the tip.

According the present embodiment, as shown in FIGS. 1 and 3, the profile of the male threadform 11 is designed such that the thread 11A at the end, closer to the tip, of the perfect-thread area of the male threadform 11 satisfies the following expressions, (1) and (2):

$$0.40 \leq \frac{\{(D_W + 2T_H)^2 - D_W^2\} \times W_{min}}{\{(OD)^2 - (ID)^2\}} \leq 0.60, \text{ and} \quad (1)$$

$$W_{min} \geq 3.0 \text{ mm.} \quad (2)$$

In expressions (1) and (2), OD is the outer diameter of the steel pipe 2, ID is the inner diameter of the steel pipe, $D_W$ is the diameter of the root adjacent to the load flank of the thread 11A, $T_H$ is the thread height of the thread 11A relative to the thread groove adjacent to its load flank, and $W_{min}$ is the thread width of the thread 11A as measured at its thread base.

The threaded connection 1 for steel pipe according to the present embodiment provides a balanced combination of high torque resistance, high sealability and high shear resistance as each of the male and female threadforms 11 and 21 is constituted by a wedge thread and the male threadform 11 is constructed such that the minimum thread width of the first thread 11A, measured at its base, of the male threadform 11 is at least 3 mm and expression (1) above is satisfied.

The present disclosure may not only be applied to coupling-type threaded connections, but also to integral threaded connections. The present disclosure is not limited to the above-illustrated embodiment, and other various modifications are possible without departing from the spirit of the present disclosure.

EXAMPLES

To verify the effects of the threaded connection for steel pipe according to the present embodiment, numerical analysis simulations were conducted by the elasto-plastic finite element method to evaluate torque resistance, sealability and shear resistance.

<Test Conditions>

For FEM analysis, a plurality of test specimens (analysis models) were created with different thread profiles, and an elasto-plastic finite element analysis was conducted for each test specimen to compare their performances. Each test specimen was a coupling-type threaded connection having the basic construction shown in FIGS. 1 to 3, in conjunction with steel pipes with the following parameters:

dimensions of steel pipes: 10-¾" 65.7# (with a pipe-body outer diameter of 273.05 mm and pipe-body inner diameter of 242.82 mm)

material: oil-well pipe material Q125 according to API standards (nominal yield strength YS=862 MPa (125 ksi))

flank angle of load and stab flanks of threads: −5°

Table 1 shows dimensions and other parameters of the threaded connections used for analysis as test specimens.

TABLE 1

| Test specimen | Thread length [mm] | Thread taper [deg] | $T_H$ [mm] | LP [mm] | SP [mm] | $W_{min}$ [mm] | $D_W$ [mm] | Expression (1) | MTV [ft·lbs] | Ts [N/mm] | Ps [%] | Real-pipe test | |
|---|---|---|---|---|---|---|---|---|---|---|---|---|---|
| #1 | 115.80 | 5.72 | 2.0 | 9.36 | 9.00 | 2.55 | 263.75 | 0.35 | 189685 | 577 | −18.69 | shear fracture | Comparative example |
| #2 | 115.80 | 5.72 | 2.0 | 9.74 | 9.37 | 2.73 | 263.76 | 0.37 | 182740 | 576 | −19.16 | not tested | Comparative example |
| #3 | 115.80 | 5.72 | 2.0 | 10.12 | 9.73 | 2.92 | 263.78 | 0.40 | 175813 | 574 | −18.42 | not tested | Comparative example |
| #4 | 115.80 | 5.72 | 2.0 | 10.50 | 10.10 | 3.12 | 263.80 | 0.43 | 168638 | 575 | −14.89 | not tested | Design example according to the present disclosure |
| #5 | 115.80 | 5.72 | 2.0 | 11.60 | 11.16 | 3.64 | 263.86 | 0.50 | 155092 | 582 | −11.78 | not tested | Design example according to the present disclosure |
| #6 | 115.80 | 5.72 | 2.0 | 12.10 | 11.64 | 3.88 | 263.88 | 0.53 | 150936 | 580 | −9.42 | not tested | Design example according to the present disclosure |
| #7 | 115.80 | 5.72 | 2.0 | 12.70 | 12.21 | 4.16 | 263.91 | 0.57 | 142677 | 583 | −8.27 | not tested | Design example according to the present disclosure |
| #8 | 123.30 | 5.72 | 2.2 | 11.00 | 10.50 | 3.29 | 263.16 | 0.49 | 209280 | 439 | −12.73 | not tested | Design example according to the present disclosure |
| #9 | 136.00 | 4.78 | 2.2 | 11.00 | 10.50 | 3.30 | 263.74 | 0.50 | 195979 | 466 | −9.10 | no shear fracture | Design example according to the present disclosure |

In Table 1, test specimen #1 was created based on design rules similar to ones for conventional middle- to small-diameter pipe connections for steel pipe, while test specimens #2 to #7 were created by modifying the design of test specimen #1 with respect to load-flank pitch LP and stab-flank pitch SP. Test specimen #8 is based on test specimen #1, having a thread profile with a load-flank pitch LP of 11.00 mm and a stab-flank pitch SP of 10.50 mm and with an increased thread height $T_H$. Test specimen #9 is based on test specimen #8, having a thread profile created by reducing the thread taper to increase the thread length. The values of expression (1) and $W_{min}$ for each of test specimens #1 to #9 were determined; it turned out that test specimens #1 to #3 had values not within the ranges of the present disclosure and thus are regarded as comparative examples, while the values of test specimens #4 to #9 were within the ranges of the present disclosure. "Thread length" in Table 1 means the entire thread length including the perfect-thread area and imperfect-thread area. "Thread taper" means the angle twice the angle between a straight line passing through the middle, as determined along the height direction of the load flank, of each thread as seen in a cross section of the male threadform, on one hand, and the axis of the thread pipe, on the other.

[Evaluation of Torque Resistance]

To evaluate torque resistance, the value at which yield initiates on a make-up torque diagram MTV (Maximum Torque Value) was treated as yield torque and was used for evaluation. The results of evaluation are shown in Table 1 and FIG. 4.

[Evaluation of Sealability]

Figure 5:
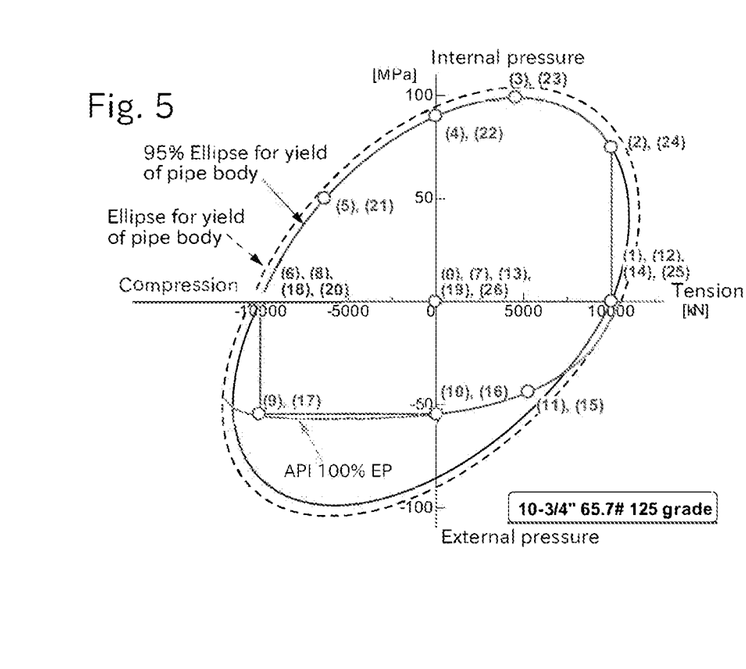
FIG. 5 shows a load path derived from evaluations of sealability using FEM analysis.

To evaluate sealability, a complex load simulating a real test was applied, as shown in FIG. 5, to calculate the sealing contact force occurring between the seal portions 13 and 22. The lowest value of contact force on the load path was treated as the minimum seal contact force Fs, and sealability was evaluated based on the magnitude of this value. The results of evaluation are shown in Table 1 and FIG. 6.

[Shear Resistance]

To evaluate shear resistance, a load of 90% of the tensile load at which the pipe body of the steel pipe 2 yields was applied, and calculated was the shear plastic strain $P_S$ on a surface portion of the male threadform 11 that is located near the thread root adjacent to the load flank of the first thread 11A (surface portion near the round portion connecting the load flank and thread-groove surface adjacent to the load flank), at which a shear fracture initiates, and it was assumed that the smaller the absolute value of $P_S$, the better the shear resistance. The results of evaluation are shown in Table 1 and FIG. 7.

[Results of Evaluation]

Figure 4:
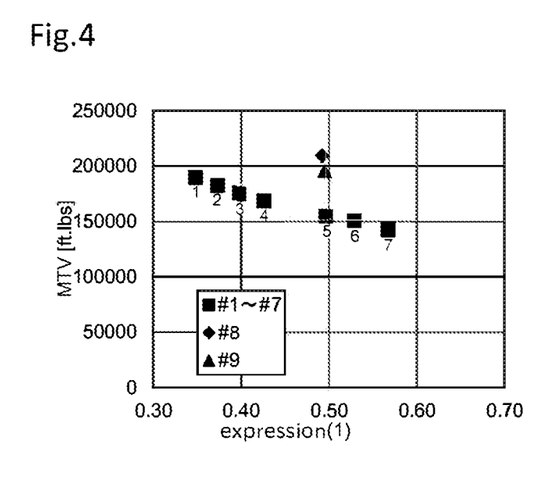
FIG. 4 graphs evaluation results of torque resistance using FEM analysis.

As shown in FIG. 4, for test specimens #1 to #7, MTV decreased somewhat as the load-flank pitch LP of the threads increased; still, the torque resistance required from a product is deemed ensured. For test specimens #8 and #9, the rigidity of the male threadform increased and the thread length increased somewhat such that MTV increased somewhat. These results suggest that a threaded connection complying with the present disclosure exhibits a torque resistance substantially equal to that of a threaded connection complying with the same design rules that are applied to conventional middle- to small-diameter pipe connections for steel pipe.

Figure 6:
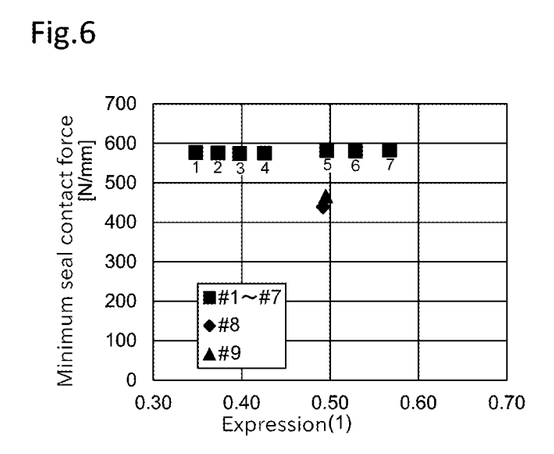
FIG. 6 graphs evaluation results of sealability using FEM analysis.

On the other hand, as shown in FIG. 6, for test specimens #1 to #7, the minimum seal contact force Fs remained substantially at the same level even when the load-flank pitch 4 of the threads varied. For each of test specimens #8 and #9, the sealability was somewhat lower than those for test specimens #1 to #7. Still, the amount of decrease remained within a tolerable range, and the sealability required of a product is deemed ensured. For each test specimen, the minimum seal contact force Fs occurred at the load step with the external pressure and compression, identified by (9), (17).

Figure 7:
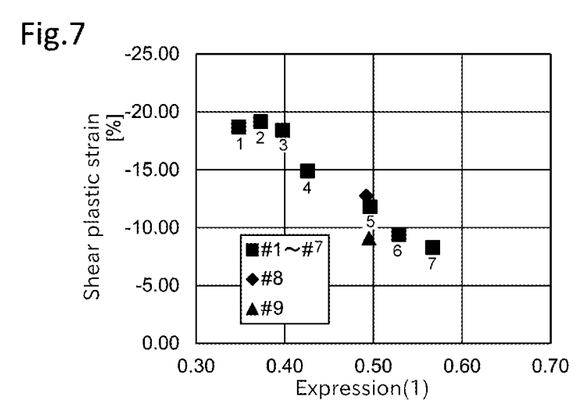
FIG. 7 graphs evaluation results of shear resistance using FEM analysis.

To evaluate shear resistance, as shown in FIG. 7, for test specimens #2 and #3, which did not satisfy the requirements of the present disclosure, the shear plastic strain Ps hardly decreased from the level of test specimen #1. For #4 to #9, which complied with the present disclosure, it can be seen that the shear plastic strain Ps significantly decreased from the level of test specimen #1.

These results demonstrate that, for each of test specimens #4 to #9, which complied with the present disclosure, the torque resistance and sealability were generally at the same levels as for test specimen #1 but the shear resistance dramatically increased.

[Real-Pipe Test]

For test specimens #1 and #9, samples were fabricated to evaluate shear resistance by real-pipe testing.

To perform surface treatment on the test samples, no surface treatment was performed on the pin after cutting, while the box was subjected to surface treatment using manganese phosphate. During make-up of the pin and the box, BOL 4010 NM, which is an environmentally compatible lubricant, was applied to the connection, and make-up was performed with a predetermined level of torque before a tensile-compressive test was conducted in which a tensile load and a compressive load were alternately applied, each of these loads being 90% of the tensile/compressive load at which the pipe body of the steel pipe yields, and it was determined whether a shear fracture occurred in the male threadform on the pin.

In these tests, for test specimen #1, a shear fracture occurred in the male threadform during the fifteenth round of tension, while, for test specimen #9, no shear fracture occurred even after the 25th round of repeated tensile and compressive loads. This proves that the threaded connection according to the present disclosure has good shear resistance.

EXPLANATION OF REFERENCES

1: threaded connection for steel pipe;
10: pin;
11: male threadform;
20: box;
21: female threadform
2: steel pipe

The invention claimed is:

1. A threaded connection for steel pipe comprising a tubular pin provided on a tip of a steel pipe with an outer diameter OD larger than 240 mm, and a tubular box adapted to be made up on the pin as the pin is screwed in, wherein the pin includes a male threadform made with a taper thread formed on an outer periphery of the pin, the box includes a female threadform made with a taper thread formed on an inner periphery of the box, each of the male and female threadforms has a dovetail-shaped cross section, and a stab-flank pitch for the male threadform and the female threadform is smaller than a load-flank pitch for the male threadform and the female threadform, and wherein the male threadform satisfies the following expressions, (1) and (2):

$$0.40 \leq \frac{\{(D_W + 2T_H)^2 - D_W^2\} \times W_{min}}{\{(OD)^2 - (ID)^2\}} \leq 0.60, \text{ and} \quad (1)$$

$$W_{min} \geq 3.0 \text{ mm}, \quad (2)$$

where, in expressions (1) and (2), OD is the outer diameter of the steel pipe, ID is the inner diameter of the steel pipe, $D_w$ is the diameter of the root adjacent to the load flank at the end of the male threadform closer to the tip, $T_H$ is the thread height of the male threadform, and $W_{min}$ is the width of the thread, measured at its thread base, in an end region of the male threadform closer to the tip.

2. The threaded connection for steel pipe according to claim 1, wherein the male threadform satisfies the following expression, (3):

$$0.45 \leq \frac{\{(D_W + 2T_H)^2 - D_W^2\} \times W_{min}}{\{(OD)^2 - (ID)^2\}} \leq 0.50. \quad (3)$$

3. The threaded connection for steel pipe according to claim 2, wherein the thread height ($T_H$) of the male threadform is not smaller than 1.8 mm.

4. The threaded connection for steel pipe according to claim 3, wherein the thread height ($T_H$) of the male threadform is not larger than 2.3 mm.

5. The threaded connection for steel pipe according to claim 4, wherein a taper angle of the male threadform is not larger than 5.72°.

6. The threaded connection for steel pipe according to claim 1, wherein the thread height ($T_H$) of the male threadform is not smaller than 1.8 mm.

7. The threaded connection for steel pipe according to claim 6, wherein the thread height ($T_H$) of the male threadform is not larger than 2.3 mm.

8. The threaded connection for steel pipe according to claim 7, wherein a taper angle of the male threadform is not larger than 5.72°.

9. The threaded connection for steel pipe according to claim 6, wherein a taper angle of the male threadform is not larger than 5.72°.

10. The threaded connection for steel pipe according to claim 9, wherein a taper angle of the male threadform is not larger than 5.72°.

11. The threaded connection for steel pipe according to claim 1, wherein the thread height ($T_H$) of the male threadform is not larger than 2.3 mm.

12. The threaded connection for steel pipe according to claim 1, wherein a taper angle of the male threadform is not larger than 5.72°.

* * * * *